Figure 1:
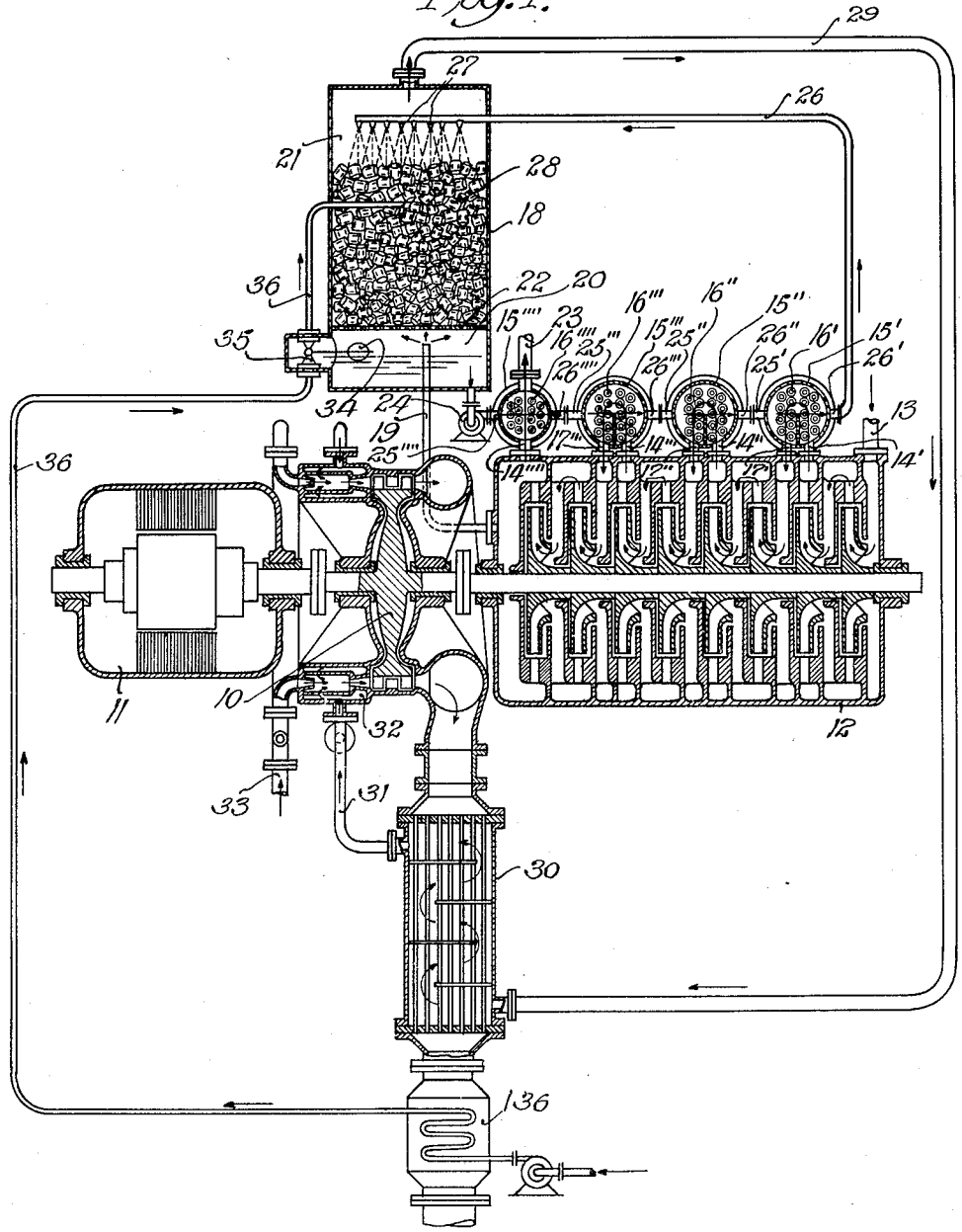

Jan. 9, 1940.  M. MARTINKA  2,186,706
COMBUSTION ENGINE AND A METHOD FOR THE OPERATION THEREOF
Filed Nov. 14, 1934  3 Sheets-Sheet 1

INVENTOR:
Michael MARTINKA
by Kurt W Feist
his Attorney

Jan. 9, 1940.   M. MARTINKA   2,186,706
COMBUSTION ENGINE AND A METHOD FOR THE OPERATION THEREOF
Filed Nov. 14, 1934   3 Sheets-Sheet 2
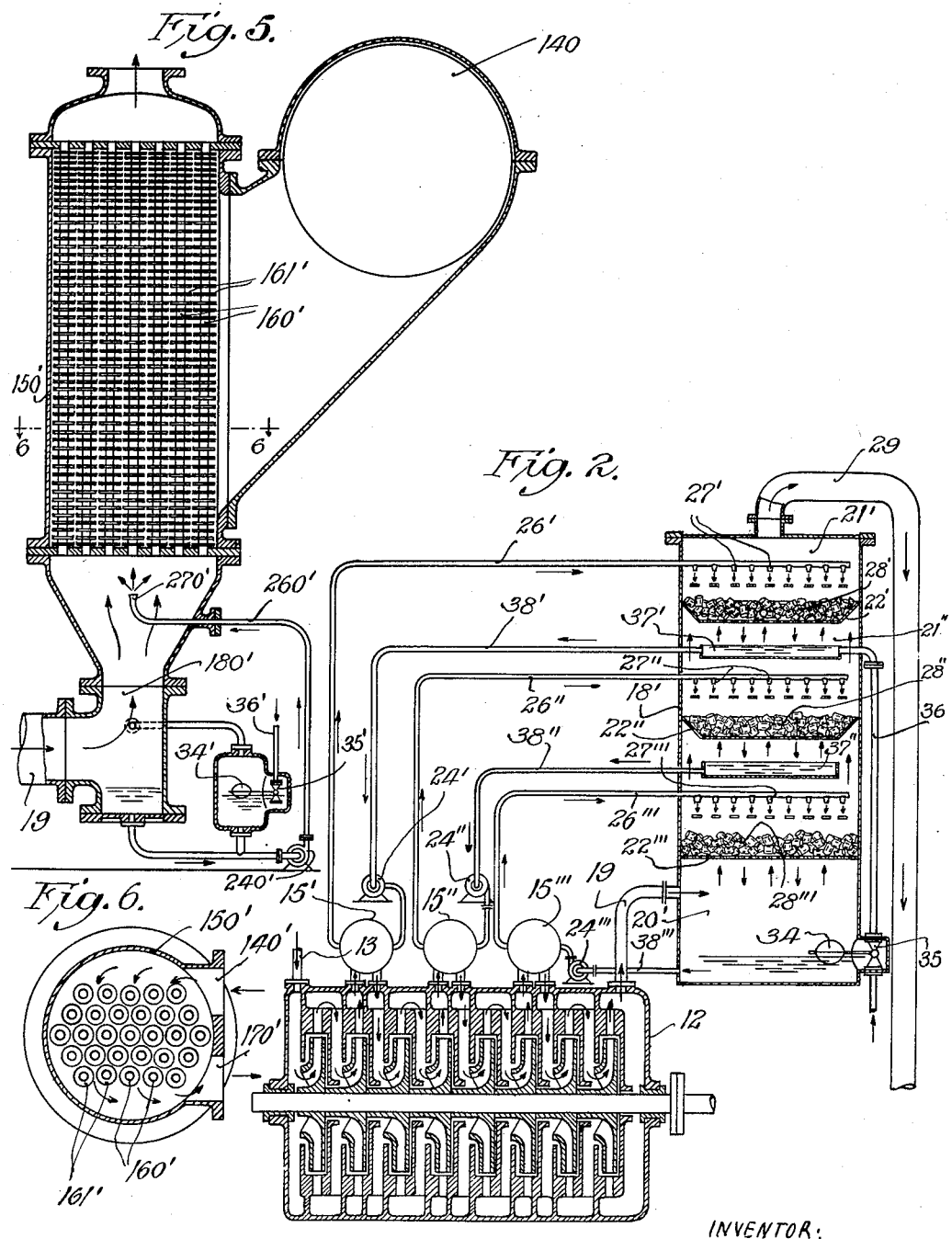
INVENTOR:
Michael MARTINKA
by K. L. Nreist
his Attorney Jan. 9, 1940. M. MARTINKA 2,186,706
COMBUSTION ENGINE AND A METHOD FOR THE OPERATION THEREOF
Filed Nov. 14, 1934 3 Sheets-Sheet 3
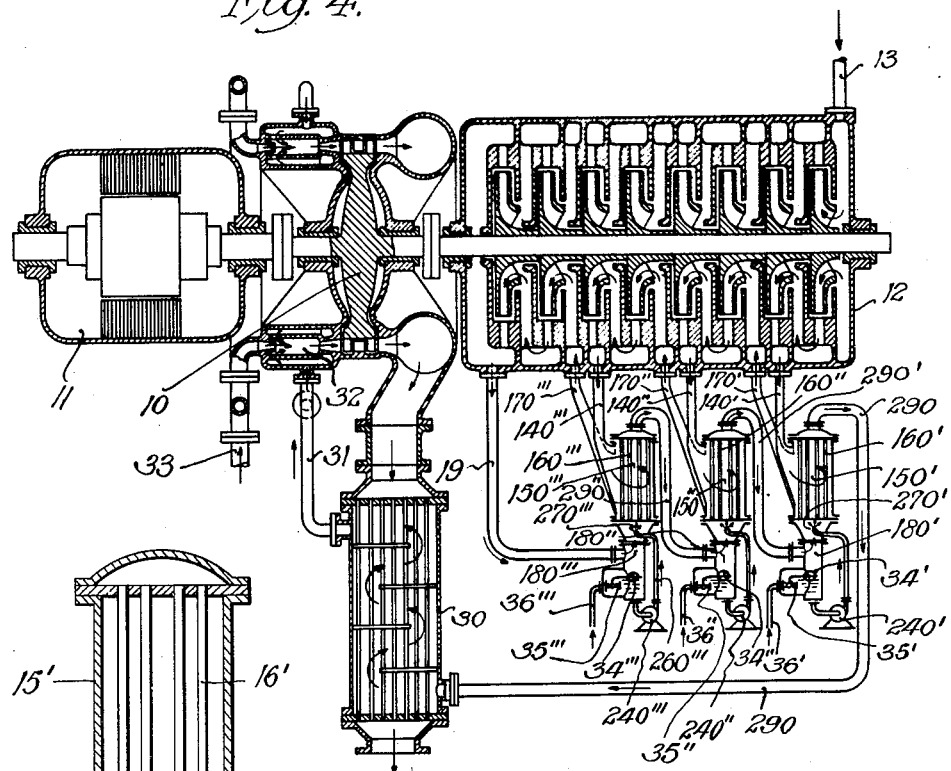
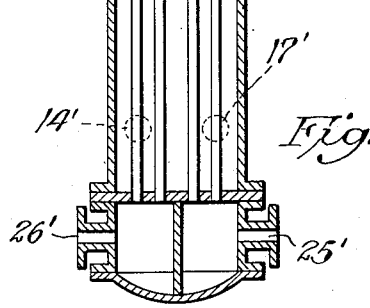
INVENTOR:
Michael MARTINKA
by Kurt H Feist
his Attorney Patented Jan. 9, 1940

2,186,706

UNITED STATES PATENT OFFICE 2,186,706

COMBUSTION ENGINE AND A METHOD FOR THE OPERATION THEREOF

Michael Martinka, Duisburg, Germany

Application November 14, 1934, Serial No. 753,068
In Germany November 14, 1933

11 Claims. (Cl. 60—42)

My invention relates to a plant comprising a combustion engine and a compressor for the production of compressed air required for the combustion of fuel and to a method for the operation of said plant. More particularly, my invention is concerned with a plant comprising a combustion gas turbine and a multi-stage air compressor driven by same.

It is understood that the term "combustion engine" used in the specification and claims has reference to an "internal combustion engine with pistons" and to a "combustion gas turbine".

One object of my invention is to provide a plant and a method for the operation of same, by means of which the heat, which is generated during the compression of the air to be introduced into the combustion chamber and is transferred into the cooling water in the intercoolers, may be utilized for the combustion engine.

In order to carry out my invention into practice, my method comprises the steps of compressing the air to a predetermined pressure, transferring the heat of compression into the cooling water by indirect heat-exchange, mixing the cooling water carrying the heat of the compression with the compressed air discharged from the compressor, evaporating a part of said heated cooling water in presence of said compressed air at a temperature being below the temperature pertaining to the boiling point of said water at the pressure given by the pressure of compressed air and cooling thereby the remaining part of the heated cooling medium to cooling temperature conducting the mixture of air and vapors thus obtained into the combustion chamber of the combustion engine, and using again the cooled water for the reception of the heat of compression. There are various embodiments of the plant possible for said method, some preferred embodiments will be described later on. As will be readily understood, my invention permits the return of the heat of compression into the thermodynamic cycle of the plant and the obtainance of the increased amount of the medium to be added to the fuel for lowering the combustion temperatures by the vapors mixed with the air, which are produced by the above mentioned particular vaporization of the heated cooling water. As the heated cooling water is cooled to cooling temperature during the above mentioned vaporization of a part of the cooling water, the entire heat of compression is in the vapors of the airvapor mixture and is returned into the thermodynamic cycle. The requirements for excess air is considerably reduced, and the compressor does not need to be oversized to a great extent.

The above objects as well as others not particularly pointed out will appear from the following description with reference to the accompanying drawings, in which Fig. 1 is a diagrammatic view of a plant, partly in section, in which the cooling water is conducted into the surface heat-exchangers of the compressor in series and is mixed with the compressed air in a separate mixing heat-exchanger, Fig. 2 is a diagrammatic view of another embodiment of the arrangement of the surface heat-exchangers and the mixing heat-exchanger, in which the cooling water passes in several cycles in parallel through said surface heat-exchanger, Fig. 3 is a sectional view of a surface heat-exchanger used in the plant shown in Figs. 1 and 2, Fig. 4 is a diagrammatic view of another embodiment of the plant, in which the cooling water is mixed with the compressed air in a chamber of the surface heat-exchangers and the mixture of water and air passes through the tubes of the surface heat-exchangers in series, Fig. 5 is a longitudinal sectional view of the surface heat-exchanger used in the plant shown in Fig. 4, Fig. 6 is a cross-sectional view of the surface heat-exchanger shown in Fig. 5, taken on line 6—6 of said Fig. 5.

Referring now to Fig. 1, 10 indicates a gas turbine, which drives an electric generator 11 and a compressor 12 positively connected to the main shaft of the turbine. The compressor has four stages. Every stage is provided with two runners arranged in series, so that every runner performs a portion of the work of compression of of the respective stage. The air or other gaseous medium to be compressed enters the compressor 12 through an inlet 13. After the first stage of compression, the air flows through the pipe 14' into the surface heat-exchanger 15' (see Fig. 3) and is cooled therein by indirect heat-exchange by the water or other liquid medium flowing through the tubes 16' of said heat-exchanger 15'. Then, the cooled air enters the second stage of the turbo-compressor 12 through the pipe 17'. After the second stage of compression the air is conducted into the surface heat-exchanger 15" through the pipe 14", is cooled by the cooling water running through the tubes 16" thereof and is led into the third stage of the compressor 12 through the pipe 17". Likewise, after the third stage of compression, the air enters the surface heat-exchanger 15'''' through the pipe 14''', is cooled in the heat-exchanger by the cooling water running through the tubes 16''' thereof and enters the last stage of the compressor through the pipe 17''''. After the last stage of compression, the air being under a predetermined pressure enters the mixing heat-exchanger 18 through the pipe 19, so that substantially the same pressure prevails behind the mixing heat-exchanger 18 as in the last stage of the compressor 12. The mixing heat-exchanger is divided into two chambers 20 and 21 by a perforated partition 22. The lower chamber 20 is partly filled with water, and the upper chamber 21 is partly filled with inert filling material such as "Raschig rings" 23.

There is another surface heat-exchanger 15'''', into which a portion of the compressed air flows from the last stage of the compressor 12 through the pipe 14''''. This portion of the compressed air, which may be used at any place of consumption, for example as motive power in pneumatic motors or the like, is cooled by the water running through the tubes 16'''' of the heat-exchanger 15'''' and flows in dry condition through the line 23 to the place of consumption. While the compressed air entering the mixing heat-exchanger 18 is introduced into the combustion chamber of the gas turbine as will be described later on, the portion of the compressed air entering the surface heat-exchanger 15'''' is conducted to a place remote from the gas turbine.

The cycle of the cooling water is as follows: The pump 24 sucks the cooling water from the chamber 20 of the mixing heat-exchanger 18 and discharges the cooling water into the tubes 16'''' of the surface heat-exchanger 15'''' through the pipe 25''''. The cooling water carrying the heat of compression of the last stage flows through the pipes 26'''', 25''' into the tubes 16''' of the heat-exchanger 15''', where it receives the heat of compression of the third stage. Then the cooling water flows in series through the pipes 26''', 25'', the tubes 16'' of the heat-exchanger 15'', the pipes 26'', 25' and the tubes 16' of the heat-exchanger 15'. The heated cooling water carrying the heat of compression of all stages leaves the surface heat-exchanger 15' through the pipe 26' connected to the line 26, which leads the heated cooling water into the upper chamber 21 of the mixing heat-exchanger 18. The heated cooling water is discharged from the line 26 through a plurality of spraying nozzles 27 and flows through the trickling bed 28 in a direction opposite to the flow of compressed air coming from the pipe 19. The temperature in the mixing heat-exchanger is below the temperature pertaining to the boiling temperature of the water at the pressure existing in said mixing heat-exchanger due to the pressure of the compressed air. As the compressed air coming from the compressor is non-saturated with moisture, a part of the heated cooling water coming from the spraying nozzles 27 is vaporized in the mixing chamber 21 by direct heat-exchange at the given temperature and pressure, whereby the heat for the vaporization of the water is taken from the water, which is cooled to the original cooling temperature of the cooling water, and from the compressed air, which at the same time is saturated and charged with moisture. Thus, an air-vapor mixture is formed in the mixing heat-exchanger 18 and the heat of compression carried by the heated cooling water in the line 26 is transferred into the vapors of the air-vapor mixture. As the air-vapor mixture is conducted into the combustion chamber of the gas turbine, as will be described hereinafter, the entire heat of compression is returned into the thermodynamic cycle of the plant and is not lost in the cooling water. On the other hand, the volume of the gaseous medium to be introduced into the combustion chamber of the gas turbine is increased by the volume of the vapors in the air-vapor mixture, which are obtained by the vaporization of the cooling water under the above mentioned particular conditions. The air-vapor mixture flows through the line 29 into the heat regenerator 30 heated by the waste gases of the gas turbine and then through the line 31 into the combustion chamber 32 of the gas turbine 10. The fuel enters the combustion chamber 32 through the pipe 33.

The mixing heat-exchanger is provided with a float 34 connected to a valve 35, which serves to maintain a predetermined amount of cooling water in the water cycle. If the level of the water in the chamber 20 falls, the float 34 opens the valve 35, and fresh supplemental water heated in the preheater 136 may enter the mixing chamber 21 through the line 36.

While in the embodiment shown in Fig. 1 the cooling water flows in series through the surface heat-exchangers 15'''', 15''', 15'' and 15', Fig. 2 shows another embodiment of my invention according to which the cooling water flows in parallel cycles through the surface heat-exchangers 15', 15'' and 15'''. Furthermore, the entire amount of compressed air is led from the last stage of compression into the mixing heat-exchanger 18' through the pipe 19; there is no fourth surface heat-exchanger 15'''' through which a portion of the compressed air is led to a place of consumption. The mixing heat-exchanger 18' has three perforated partitions 22', 22'' and 22''', which divide the mixing heat-exchanger into four chambers 21', 21'', 21''' and 20' and may receive beds 28', 28'' and 28''' of "Raschig rings." There are three parallel cycles of cooling water. The first cycle is formed by the pump 24', the tubes of the surface heat-exchanger 15' having the construction shown in Fig. 3, the line 26', the spraying nozzles 27', a receptacle 37' for the reception of the non-vaporized and cooled water leaving the trickling bed 28', and the line 38'. The second cycle is formed by the pump 24'', the tubes of the surface heat-exchanger 15'', the line 26'', the spraying nozzles 27'', the receptacle 37'', and the line 38''. The third cycle is formed by the pump 24''', the tubes of the surface heat-exchanger 15''', the line 26''', the spraying nozzles 27''', the chamber 20' receiving the non-vaporized cooled water from the trickling bed 28''', and the line 38'''. The spraying nozzles 27', 27'', 27''', the trickling beds 28', 28'', 28''' and the receptacles 37', 37'', 20' are arranged in different levels above each other. A float 34 connected to a valve 35 serves to admit supplemental water through the line 36 into the receptacle 37', if the level of the cooling water in the chamber 20' falls below a predetermined height. The operation of the mixing heat-exchanger 18' is the same as the above described mixing heat-exchanger 18 arranged in the embodiment shown in Fig. 1. The compressed air and the cooling water flow in a direction opposite to each other, a portion of the water is vaporized at a temperature below the temperature of the boiling point of the water at the pressure in the mixing heat-exchanger determined by the pressure of the compressed air, the cooled water is returned into the different cycles of cooling water, and the compressed air charged with moisture leaves the mixing heat-exchanger 18' through the line 29 to be introduced into the combustion chamber of the gas turbine.

Fig. 4 shows still another embodiment of the plant according to my invention. In this instance, the cooling medium flows in series through the surface heat-exhangers 150''', 150'' and 150' likewise to the embodiment shown in Fig. 1, but a separate mixing heat-exchanger has been omitted and the intimate mixing of the compressed air with water takes place in the surface heat-exchangers, and the cooling medium receiving the heat of compression in the tubes of the surface heat-exchangers is an air-moisture mixture. Furthermore, likewise as to the embodiment shown in Fig. 2, a fourth surface heat-exchanger has been omitted and the entire amount of compressed air is led into the combustion chamber 32 of the gas-turbine 10. Figs. 5 and 6 illustrate in an enlarged scale a surface heat-exchanger as it may be used in the embodiment of the plant shown in Fig. 4. After the first stage of compression the air enters the surface heat-exchanger 150' through the line 140', is cooled by the cooling medium flowing through the tubes 160' which may be provided with a plurality of horizontal ribs 161' at their outside, and leaves the surface heat-exchanger through the line 170'. Likewise, the compressed air flows through the surface heat-exchangers 150'' and 150''', after the second and third stage of compression. After the last stage of compression, the entire amount of compressed air flows through the line 19 into a mixing chamber 180''' arranged below the series of vertical tubes 160''' of the surface heat-exchanger 150'''. The lower part of this mixing chamber 180''' is filled with water, and a pump 240''' sucks the water from the lower part of said chamber 180''' and forces the water through the line 260''' and spraying nozzle 270''' into the upper part of mixing chamber 180'''. The conditions of pressure and temperature in the mixing chamber 180''' and within the tubes 160''' connected thereto are the same as described in connection with the mixing heat-exchanger in the embodiments shown in Figs. 1 and 2, so that a part of the water is vaporized and the air is charged with moisture within said chamber 180''' and the tubes 160''', while the non-vaporized and cooled water drops into the lower part of the chamber 180'''. The air-vapor mixture leaves the surface heat-exchanger 150''' through the line 290'' and enters the mixing chamber 180'' of the surface heat-exchanger 150'', where the pump 240'' discharges water through the nozzle 270'', so that the same phenomena takes place as in the surface heat-exchanger 150'''. Likewise, the air-vapor mixture leaves the surface heat-exchanger 150'' through the line 290', enters the mixing chamber 180' of the surface heat-exchanger 160', and is mixed with water delivered from the pump 240'. Finally, the air-vapor mixture ready for the introduction into the combustion chamber of the combustion engine leaves the surface heat-exchanger 160' through the line 290, and enters the combustion chamber 32 of the turbine 10 through the heat-regenerator 30 and the line 31.

Each of the mixing chambers 180', 180'', 180''' is provided with a float 34', 34'', 34''' connected to a valve 35', 35'', 35''' for the admission of supplemented water through the line 36', 36'', 36''', if the level of the water in the mixing chamber falls below a predetermined height.

While the fuel used in the above described embodiments is a liquid fuel, a gaseous fuel, such as regenerator-gas or blast-furnace-gas could be used for the operation of the combustion engine. In such an instance, the gaseous fuel entering the combustion chamber of the combustion engine must be at the same pressure as the compressed air entering said combustion chamber. In other words, the gaseous fuel must be compressed prior to its introduction into the combustion chamber. Under these circumstances, heat of compression is produced by the compression of the gaseous fuel or medium, and the same methods as described above in connection with the heat of compression produced by the compression of the air may be applied to the utilization of the heat of compression produced by the compression of the gaseous fuel, so that vapors may be formed in heat-exchangers by said heat of compression produced by the compression of the gaseous fuel or medium which may be introduced into the compressed gaseous fuel or medium to be led into the combustion chamber of the engine.

I have described preferred embodiments of my invention, but it is clear that numerous changes and omissions may be made without departing from the spirit of my invention. For example, an internal combustion engine having pistons could be used in any of the illustrated embodiments instead of a combustion gas-turbine.

I claim:

1. In a method for the operation of a plant comprising a combustion engine and a compressor driven by said combustion engine for the production of a compressed gaseous medium to be introduced into the combustion chamber of said combustion engine, the steps of compressing the gaseous medium to a predetermined pressure, transferring the heat of compression into a liquid cooling medium by indirect heat-exchange, mixing the liquid cooling medium carrying the heat of the compression with the compressed gaseous medium discharged from the compressor, evaporating a part of said heated liquid cooling medium in presence of said compressed gaseous medium at a temperature below the temperature pertaining to the boiling point of said liquid medium at the pressure determined by the pressure of the compressed gaseous medium and cooling thereby the remaining part of the heated liquid cooling medium to cooling temperature, conducting the mixture of gaseous medium and vapors thus obtained into the combustion chamber of the combustion engine, and using again the cooled liquid cooling medium for the reception of the heat of compression.

2. In a method for the operation of a plant comprising a combustion engine and a compressor driven by said combustion engine for the production of a compressed gaseous medium to be introduced into the combustion chamber of said combustion engine, the steps of compressing the gaseous medium to a predetermined pressure, branching off a portion of the compressed gaseous medium to a place of consumption, transferring the heat of compression into a liquid cooling medium by indirect heat-exhange, mixing the liquid cooling medium carrying the heat of compression with the un-branched portion of the compressed gaseous medium discharged from the compressor, evaporating a part of said heated liquid cooling medium in presence of said compressed gaseous medium at a temperature below the temperature pertaining to the boiling point of said liquid medium at the pressure determined by the pressure of the compressed gaseous medium and cooling thereby the remaining part of the heated liquid cooling medium to cooling temperature, conducting the mixture of gaseous medium and vapors thus obtained into the combustion chamber of the combustion engine, and using again the cooled liquid cooling medium for the reception of the heat of compression.

3. In a method for the operation of a plant comprising a combustion engine and a compressor driven by said combustion engine for the production of a compressed gaseous medium to be introduced into the combustion chamber of said combustion engine, the steps of compressing the gaseous medium in several stages to a predetermined pressure, transferring the heat of compression after every stage with the exception of the last stage into a liquid cooling medium by indirect heat-exchange, leading the liquid cooling medium in a single cycle in series through the several places of indirect heat-exchange, mixing the liquid cooling medium carrying the heat of compression with the compressed gaseous medium discharged from the last stage of the compressor, evaporating a part of said heated liquid cooling medium in presence of said compressed gaseous medium at a temperature below the temperature pertaining to the boiling point of said liquid medium at the pressure determined by the pressure of the compressed gaseous medium and cooling thereby the remaining part of the heated liquid cooling medium to cooling temperature, conducting the mixture of gaseous medium and vapors thus obtained into the combustion chamber of the combustion engine, and using again the cooled liquid cooling medium for the reception of the heat of compression.

4. In a method for the operation of a plant comprising a combustion engine and a compressor driven by said combustion engine for the production of a compressed gaseous medium to be introduced into the combustion chamber of said combustion engine, the steps of compressing the gaseous medium in several stages to a predetermined pressure, transferring the heat of compression after every stage with the exception of the last stage into a liquid cooling medium by indirect heat exchange, leading the liquid cooling medium in several cycles in parallel through the several places of indirect heat-exchange, mixing the liquid cooling medium carrying the heat of compression with the compressed gaseous medium discharged from the last stage of the compressor, evaporating a part of said heated liquid cooling medium in presence of said compressed gaseous medium at a temperature below the temperature pertaining to the boiling point of said liquid medium at the pressure determined by the pressure of the compressed gaseous medium and cooling thereby the remaining part of the heated liquid cooling medium to cooling temperature, conducting the mixture of gaseous medium and vapors thus obtained into the combustion chamber of the combustion engine, and using again the cooled liquid cooling medium for the reception of the heat of compression.

5. In a method for the operation of a plant comprising a combustion engine and a compressor driven by said combustion engine for the production of a compressed gaseous medium to be introduced into the combustion chamber of said combustion engine, the steps of compressing the gaseous medium in several stages to a predetermined pressure, transferring the heat of compression after every stage with the exception of the last stage into a liquid cooling medium by indirect heat exchange, leading the liquid cooling medium in several cycles in parallel through the several places of indirect heat exchange, leading the liquid cooling medium of all said cycles in different levels into a heat-exchanger and mixing therein the liquid cooling medium carrying the heat of compression with the compressed gaseous medium discharged from the last stage of the compressor, evaporating a part of said heated liquid cooling medium in presence of said compressed gaseous medium at a temperature below the temperature pertaining to the boiling point of said liquid medium at the pressure determined by the pressure of the compressed gaseous medium and cooling thereby the remaining part of the heated liquid cooling medium to cooling temperature, conducting the mixture of gaseous medium and vapors thus obtained into the combustion chamber of the combustion engine, and using again the cooled liquid cooling medium for the reception of the heat of compression.

6. In a method for the operation of a plant comprising a combustion engine and a compressor driven by said combustion engine for the production of a compressed gaseous medium to be introduced into the combustion chamber of said combustion engine, the steps of compressing the gaseous medium in several stages to a predetermined pressure, branching off a portion of the compressed gaseous medium from the last stage to a place of consumption, transferring the heat of compression after every stage with the exception of the last stage into a liquid cooling medium by indirect heat-exchanger, leading the liquid cooling medium in a single cycle in series through the several places of indirect heat-exchange, mixing the liquid cooling medium carrying the heat of compression with the unbranched portion of the compressed gaseous medium discharged from the last stage of the compressor, evaporating a part of said heated liquid cooling medium in presence of said compressed gaseous medium at a temperature below the temperature pertaining to the boiling point of said liquid medium at the pressure determined by the pressure of the compressed gaseous medium and cooling thereby the remaining part of the heated liquid cooling medium to cooling temperature, conducting the mixture of gaseous medium and vapors thus obtained into the combustion chamber of the combustion engine, and using again the cooled liquid cooling medium for the reception of the heat of compression.

7. In a method for the operation of a plant comprising a combustion engine and a compressor driven by said combustion engine for the production of a compressed gaseous medium to be introduced into the combustion chamber of said combustion engine, the steps of compressing the gaseous medium in several stages to a predetermined pressure, mixing a liquid cooling medium with the compressed gaseous medium discharged from the last stage of the compressor, evaporating a part of said liquid cooling medium in presence of said compressed gaseous medium at a temperature below the temperature pertaining to the boiling point of said liquid medium at the pressure determined by the pressure of the compressed gaseous medium and cooling thereby the remaining part of the heated liquid cooling medium to cooling temperature, conducting the mixture of gaseous medium and vapors thus obtained into the combustion chamber of the combustion engine, transferring the heat of compression after every stage with the exception of said last stage by indirect heat exchange into said mixture of gaseous mediums and vapors prior to their introduction into the combustion chamber of the combustion engine, and using again the cooled liquid cooling medium for the reception of the heat of compression.

8. A plant comprising: a combustion engine, a multi-stage compressor driven by said combustion engine for the production of a compressed gaseous medium, a plurality of surface heat-exchangers connected to said compressor for the indirect heat-transfer between the compressed gaseous medium and a liquid cooling medium after each stage of compression with the exception of the last stage of compression, a mixing heat-exchanger, a pipe connecting the last stage of the compressor with said mixing heat-exchanger for the introduction of the compressed gaseous medium into said mixing heat-exchanger, a system of lines leading the liquid cooling medium through said surface heat-exchangers and into said mixing heat-exchanger designed to evaporate a part of the heated liquid cooling medium in the presence of said compressed gaseous medium at a temperature below the temperature pertaining to the boiling point of said liquid medium at the pressure determined by the pressure of the compressed gaseous medium, and a conduit connecting said mixing heat-exchanger with the combustion engine for the introduction of the mixture of gaseous medium and vapors obtained in said mixing heat-exchanger into said combustion engine.

9. A plant comprising: a combustion engine, a multi-stage compressor driven by said combustion engine for the production of a compressed gaseous medium, a plurality of surface heat-exchangers connected to said compressor for the indirect heat-transfer between the compressed gaseous medium and a liquid cooling medium after each stage of compression with the exception of the last stage of compression, a mixing heat-exchanger, a pipe connecting the last stage of the compressor with said mixing heat-exchanger for the introduction of the compressed gaseous medium into said mixing heat-exchanger, an additional surface heat-exchanger, a line leading to a place of consumption connected to said additional surface heat-exchanger, a branching pipe connecting the last stage of the compressor with said additional surface heat-exchanger for branching off a portion of the compressed gaseous medium into said line of consumption, a system of lines leading the liquid cooling medium through said plurality of surface heat-exchangers and through said additional heat-exchanger and into said mixing heat-exchanger designed to evaporate a part of the heated liquid cooling medium in the presence of said compressed gaseous medium at a temperature below the temperature pertaining to the boiling point of said liquid medium at the pressure determined by the pressure of the compressed gaseous medium, and a conduit connecting said mixing heat-exchanger with the combustion engine for the introduction of the mixture of gaseous medium and vapors obtained in said mixing heat-exchanger into said combustion engine.

10. A plant as claimed in claim 8, in which said system of lines leads the liquid cooling medium in a single cycle in series through said surface heat-exchangers.

11. A plant as claimed in claim 9, in which said system of lines leads the liquid cooling medium in a single cycle in series through said additional surface heat-exchanger and said plurality of surface heat-exchangers.

MICHAEL MARTINKA.